(12) United States Patent
Ookada et al.

(10) Patent No.: US 9,802,766 B2
(45) Date of Patent: Oct. 31, 2017

(54) SUSPENSION CONVEYING DEVICE

(71) Applicants: Daifuku Co., Ltd., Osaka (JP); Toyota Jidosha Kabushiki Kaisha, Aichi-ken (JP)

(72) Inventors: Koichi Ookada, Osaka (JP); Hisashi Kyotani, Shiga (JP); Teruaki Nabeta, Osaka (JP); Takaharu Suzuki, Shiga (JP); Kazutaka Nagasaka, Aichi-ken (JP); Kenichi Furuta, Aichi-ken (JP)

(73) Assignees: Daifuku Co., Ltd. (JP); Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 15/251,648

(22) Filed: Aug. 30, 2016

(65) Prior Publication Data

US 2017/0073167 A1 Mar. 16, 2017

(30) Foreign Application Priority Data

Sep. 10, 2015 (JP) ................ 2015-178497

(51) Int. Cl.
*B65G 49/04* (2006.01)
*B65G 35/06* (2006.01)
*B62D 65/18* (2006.01)

(52) U.S. Cl.
CPC ......... *B65G 49/0463* (2013.01); *B62D 65/18* (2013.01); *B65G 35/066* (2013.01); *B65G 49/0422* (2013.01); *B65G 49/0454* (2013.01); *B65G 49/0459* (2013.01)

(58) Field of Classification Search
CPC ............ B65G 49/0463; B65G 49/0422; B65G 49/0459; B65G 49/0454
See application file for complete search history.

(56) References Cited

U.S. PATENT DOCUMENTS 5,364,469 A * 11/1994 Wakabayashi ........ B61B 10/022
118/423
6,254,681 B1 * 7/2001 Simon ................ B65G 49/0463
118/423

(Continued)

FOREIGN PATENT DOCUMENTS

JP H06240495 A 8/1994
JP 2000006792 A 1/2000

(Continued)

*Primary Examiner* — Thomas Randazzo
(74) *Attorney, Agent, or Firm* — St. Onge Steward Johnston & Reens LLC

(57) ABSTRACT

A suspension conveying device according to the present invention includes screw shafts of two suspension line pulling-up/feeding mechanisms in a conveying traveling body 1. The screw shafts have low-speed drive regions, in which feed pitches for driven bodies are small, and high-speed drive regions, in which feed pitches for the driven bodies are large. The screw shafts are installed so that the low-speed drive regions and the high-speed drive regions are disposed mutually oppositely as viewed from the driven bodies when a conveyed object supporter is at one end of an elevation/lowering stroke, and the conveyed object supporter is tilted in a middle of the elevation/lowering stroke when the screw shafts are driven to undergo forward/reverse rotation at a fixed speed by a motor.

7 Claims, 11 Drawing Sheets

(56) References Cited

U.S. PATENT DOCUMENTS

| | | | | |
|---|---|---|---|---|
| 6,610,187 | B2* | 8/2003 | Nonomura | B05C 3/10 |
| | | | | 118/602 |
| 7,134,541 | B2* | 11/2006 | Matsubara | B65G 49/0459 |
| | | | | 198/378 |
| 7,497,321 | B2* | 3/2009 | Matsubara | B65G 49/0459 |
| | | | | 198/345.3 |
| 8,272,500 | B2* | 9/2012 | Nishikawa | B65G 33/04 |
| | | | | 198/465.1 |
| 8,356,705 | B2* | 1/2013 | Guerra | B62D 65/18 |
| | | | | 118/425 |
| 8,561,780 | B2* | 10/2013 | Albeck | B65G 49/0459 |
| | | | | 118/409 |
| 9,016,464 | B2* | 4/2015 | Andreae | B66C 19/00 |
| | | | | 198/678.1 |
| 2006/0180470 | A1* | 8/2006 | Fage | B62D 65/18 |
| | | | | 204/622 |
| 2016/0156815 | A1* | 6/2016 | Watts | H04N 5/2251 |
| | | | | 248/323 |

FOREIGN PATENT DOCUMENTS

| | | | |
|---|---|---|---|
| JP | 2004315837 A | 11/2004 | |
| JP | 2008303418 A | 12/2008 | |

\* cited by examiner

SUSPENSION CONVEYING DEVICE

FIELD OF THE INVENTION

The present invention relates to a suspension conveying device by which a conveyed object that is suspendedly conveyed can be elevated and lowered at a specific location within a conveying path.

BACKGROUND OF THE INVENTION

This type of suspension conveying device is utilized, for example, as a suspension conveying means for an automotive vehicle body in a pretreatment electrodeposition process for coating, that is, as a suspension conveying means by which an automotive vehicle body that is suspendedly conveyed is lowered and immersed into and then moved in a treatment tank filled with a treatment liquid. In regard to such a suspension conveying device, it is known, as described in Japanese Published Unexamined Patent Application No. 2000-6792 (Patent Literature 1), to tilt an automotive vehicle body during elevation/lowering movement of the automotive vehicle body in order to lower the automotive vehicle body with little resistance and smoothly into a treatment tank and to lessen residual treatment liquid within the automotive vehicle body that is drawn up from inside the treatment tank. The suspension conveying device described in Patent Literature 1 has a configuration where a conveying traveling body is provided with two front and rear suspension lines that suspend a conveyed object supporter and two suspension line pulling-up/feeding means that elevate and lower the two front and rear suspension lines respectively and individually, the respective suspension line pulling-up/feeding means include screw shafts self-rotatably borne by the conveying traveling body and driven bodies engaged with the screw shafts and moved reciprocally by forward/reverse rotation of the screw shafts to perform pulling-up/feeding operation of the suspension lines, the screw shafts, respectively included in the two suspension line pulling-up/feeding means, are respectively configured to be capable of being individually driven to rotate forward and in reverse by motors, and, in a stroke of elevating or lowering the conveyed object supporter, the suspended conveyed object can be tilted during the elevation or lowering by individually changing the rotation speeds of the respective screw shafts.

SUMMARY OF THE INVENTION

With the configuration described in Patent Literature 1, the conveyed object is tilted in the middle of elevation or lowering by individually changing the rotation speeds of the screw shafts respectively included in the two suspension line pulling-up/feeding means and because not only is a motor thus required in each of the two suspension line pulling-up/feeding means but a control means of performing speed control of each motor individually is required, there is a problem of the equipment cost of the device as a whole being extremely high. In addition, malfunction of an electrical system for control may also disable tilting of the conveyed object as predetermined.

The present invention proposes a suspension conveying device capable of solving the problems of the conventional art such as the above, and to describe by providing reference symbols in parentheses used in the description of embodiments below to facilitate understanding the relationship with the embodiments, the suspension conveying device according to the present invention has a configuration such that in a suspension conveying device where a conveying traveling body (1) is provided with a conveyed object supporter (9), two suspension lines (10, 11) that suspend the conveyed object supporter (9), and two suspension line pulling-up/feeding means (12, 13) that elevate and lower the two suspension lines (10, 11) respectively and individually, the respective suspension line pulling-up/feeding means (12, 13) include screw shafts (14, 15) self-rotatably borne by the conveying traveling body (1) and driven bodies (16, 17) engaged with the screw shafts (14, 15) and moved reciprocally by forward/reverse rotation of the screw shafts (14, 15) to perform pulling-up/feeding operation of the suspension lines (10, 11), and a motor (18) is included that drives the screw shafts (14, 15) of the respective suspension line pulling-up/feeding means (12, 13) to rotate forward and in reverse, the screw shaft (14, 15) of each suspension line pulling-up/feeding means (12, 13) is provided with a low-speed drive region (14a, 15a), in which a feed pitch for the driven body (16, 17) is small, and a high-speed drive region (14b, 15b), in which a feed pitch for the driven body (16, 17) is large, the respective screw shafts (14, 15) are installed so that the low-speed drive regions (14a, 15a) and the high-speed drive regions (14b, 15b) are disposed mutually oppositely as viewed from the driven bodies (16, 17) when the conveyed object supporter (9) is at one end of an elevation/lowering stroke, and the conveyed object supporter (9) is tilted in a middle of the elevation/lowering stroke when the screw shafts (14, 15) of the respective suspension line pulling-up/feeding means (12, 13) are driven to undergo forward/reverse rotation at a fixed speed by the motor (18).

According to the above configuration of the present invention, when the suspended conveyed object is elevated or lowered, the suspended conveyed object can be tilted automatically in the middle of elevation or lowering through actions of the high-speed drive regions and the low-speed drive regions included in the respective screw shafts by simply driving the screw shafts of the respective suspension line pulling-up/feeding means to undergo forward/reverse rotation at a fixed speed by means of the motor. Therefore, when the present suspension conveying device is to be utilized as a suspension conveying means in a coating line, etc., where an automotive vehicle body that is suspendedly conveyed is lowered into a treatment tank and subject to immersion treatment, by simply making the motor drive the screw shafts of the respective suspension line pulling-up/feeding means to undergo forward/reverse rotation at a fixed speed so as to lower the automotive vehicle body to a vicinity to an inner bottom portion of the treatment tank at an entrance of the treatment tank and pull up the automotive vehicle body from inside the treatment tank at an exit of the treatment tank, the automotive vehicle body can be tilted, for example, so as to lower it from its rear end portion into the treatment tank at the entrance of the treatment tank and the automotive vehicle body can be tilted, for example, so as to pull it up from its front end portion from inside the treatment tank at the exit of the treatment tank, and the effects due to tilting the automotive vehicle body, such as described above, can be obtained reliably. Moreover, with the configuration of the present invention, there is absolutely no need to control the rotation speeds of the respective screw shafts to change the pulling-up/feeding speeds of the respective suspension lines when driving the screw shafts of the respective suspension line pulling-up/feeding means to undergo forward/reverse rotation by the motor as in the conventional case and it suffices to simply make both screw shafts undergo forward/reverse rotation at a fixed speed, and therefore the configuration of the control system is made extremely simple and can be implemented inexpensively and predetermined tilting operations can be performed on the suspendedly conveyed object with stability and without fail at all times.

Although a configuration of using two motors that respectively and individually drive the screw shafts (14, 15) of the respective suspension line pulling-up/feeding means (12, 13) is also possible, for practical purposes, it is preferable, in terms of reducing cost and realizing accurate movements, to configure so that the screw shafts (14, 15) of the respective suspension line pulling-up/feeding means (12, 13) are driven to undergo forward/reverse rotation by a single motor (18). In this case, it is possible to configure so that the screw shafts (14, 15) of the respective suspension line pulling-up/feeding means (12, 13) are disposed to be in series with respect to each other, mutually adjacent inner end portions of the respective screw shafts (14, 15) are interlockingly coupled to the single motor (18), and, when the screw shafts of the respective suspension line pulling-up/feeding means are driven to undergo forward/reverse rotation at a fixed speed by the single motor, the driven bodies (16, 17) of the respective suspension line pulling-up/feeding means (12, 13) undergo a mutually approaching or separating movement. Further, it is preferable for the screw shafts (14, 15) of the respective suspension line pulling-up/feeding means (12, 13) to have mutually reverse screw structures and thereby be configured to be driven to undergo forward/reverse rotation in the same direction by the motor (18). By these configurations, an interlocking mechanism between the single motor and the two screw shafts is simplified to enable further reduction of cost.

Further, more specifically, the suspension lines (10, 11) of the respective suspension line pulling-up/feeding means (12, 13) may be hung down from suspension guide wheels (20, 21), pivotally supported at two locations separated in a front/rear direction at a substantially central position of a width of the conveying traveling body (1), to suspend two front and rear locations of the conveyed object supporter (9), the screw shafts (14, 15) of the respective suspension line pulling-up/feeding means (12, 13) may be borne to be in series concentrically in a front/rear direction at lateral side positions of the suspension guide wheels (20, 21), the inner end portions of both screw shafts (14, 15) may be interlockingly coupled to the single motor (18), the driven bodies (16, 17) of the respective suspension line pulling-up/feeding means (12, 13) may each have a structure including a main body (23), supported, in a manner enabling front/rear reciprocal movement in parallel to the corresponding screw shaft (14, 15), by a pair of right and left guide rails (26, 27) laid at an upper side of the screw shaft (14, 15), a driven roller (24) pivotally supported by a vertical support shaft at a lower side of the main body (23) and engaged with the screw shaft (14, 15) at a lower side, and a suspension line latching member (25) juxtaposed to the main body (23) so as to protrude, via an upper side of the guide rail (26, 27), to the side at which the suspension guide wheel (20, 21) is disposed, and the suspension lines (10, 11), having one ends latched to the suspension line latching members (25) of the respective driven bodies (16, 17), may be tensioned to hang down via turning guide wheels (30, 31), pivotally supported to be adjacent to the inner end portions of the respective screw shafts (14, 15), and the suspension guide wheels (20, 21).

Also, when the device according to the present invention is to be utilized to suspendingly convey an automotive vehicle body in a treatment line for coating, etc., described above, a configuration may be made where a fixed position (Y), at which the conveying traveling body (1) is to be stopped to elevate or lower the conveyed object supporter (9), is set in a travel path of the conveying traveling body (1), a pair of right and left guide rollers (34) are pivotally supported in a mutually concentric manner by the conveyed object supporter (9), a pair of right and left vertical guide rails (33), engaging with the guide rollers (34) of the conveyed object supporter (9), which is driven by the suspension line pulling-up/feeding means (12, 13) to be elevated or lowered with respect to the conveying traveling body (1) stopped at the fixed position (Y), are laid at the fixed position (Y), and the tilting of the conveyed object supporter (9) in the front/rear direction is performed with the pair of right and left guide rollers (34), which are elevated or lowered in engagement with the guide rails (33), as fulcrums. With the present configuration, front/rear direction swinging of the conveyed object supporter, which is elevated and lowered in a state of being suspended by the suspension lines, can be prevented by the pair of right and left guide rollers being elevated and lowered in engagement with the pair of right and left guide rails of the elevation/lowering path side to enable elevation and lowering movements to be performed with good stability and moreover, the tilting in the front/rear direction, which is the primary object, can be performed smoothly with the pair of right and left guide rails as fulcrums.

Also, when the above configuration is adopted, steady guide rollers (34*b*), which engage with the pair of right and left guide rails (33) to set the position of the conveyed object supporter (9) in a right/left direction, may be installed adjacent to the pair of right and left guide rollers (34) and an auxiliary cam rail (38), on and along which the steady guide roller (34*b*) at one side can ride and pass while accompanying tilting of the conveyed object supporter (9) in the right/left direction, may be installed additionally in a guide rail at one side among the pair of right and left guide rails (33). With the present configuration, the conveyed object supporter that is elevated or lowered at the fixed position can also be tilted in the right/left direction in a middle of the elevation or lowering, and therefore especially when the device according to the present invention is to be utilized as a suspension conveying device in a line of immersingly moving an automotive vehicle body in a coating or other treatment liquid, by applying the present configuration at a location at which the conveyed object is pulled upward from inside the treatment liquid at the exit of the treatment tank, the conveyed object that is pulled upward from inside the treatment liquid can be tilted in both the front/rear and right/left directions to encourage discharge of the treatment liquid remaining inside the conveyed object (automotive vehicle body).

DETAILED DESCRIPTION OF THE INVENTION

Figure 1:
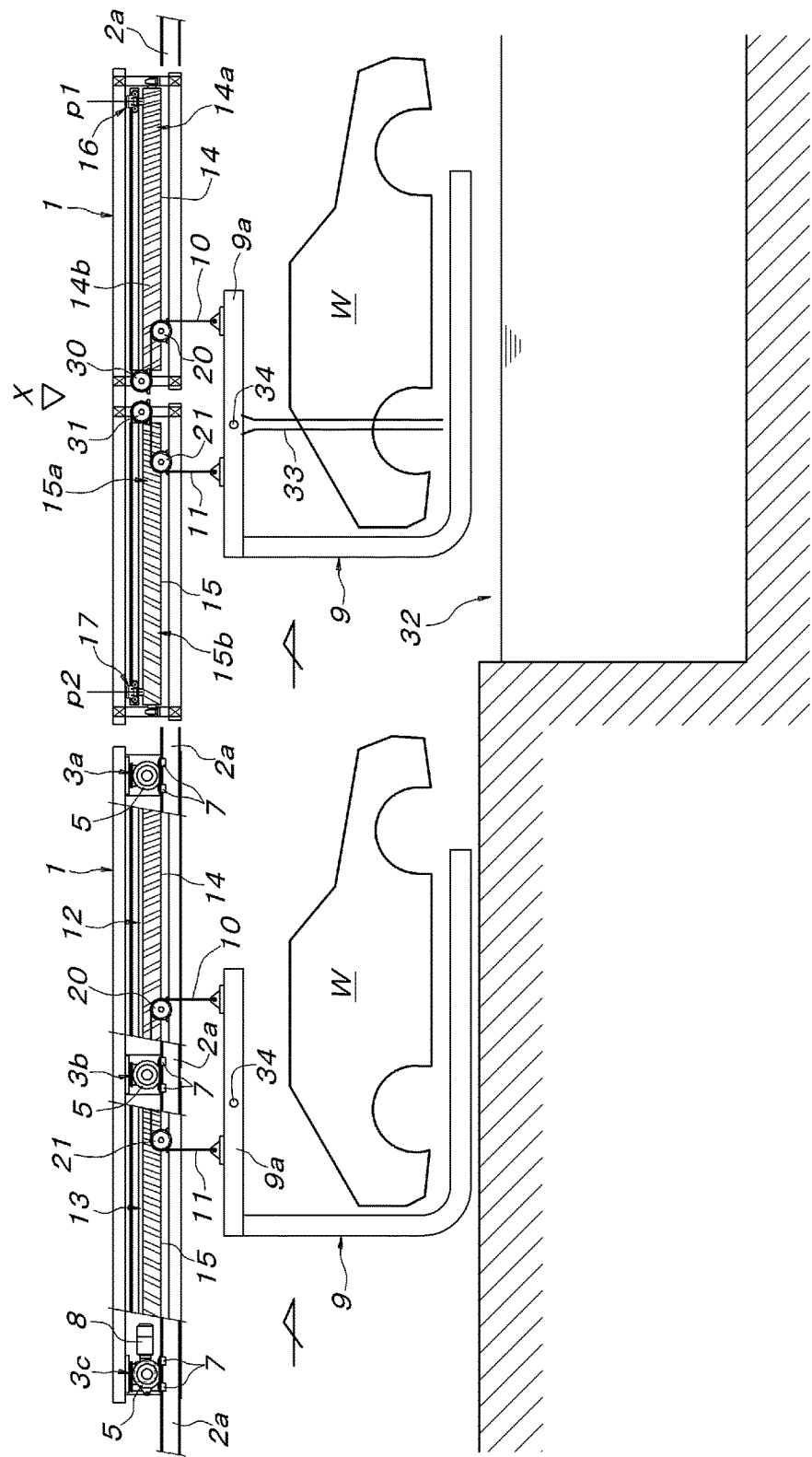
FIG. 1 is a partial longitudinal sectional side view illustrating an entrance portion of a treatment tank and a conveying traveling body suspendingly conveying a conveyed object.

To describe an embodiment of the present invention based on FIG. 1 to FIG. 4, a conveying traveling body 1 is supported by one pair of right and left guide rails 2a and 2b so as to be capable of travel on a fixed travel path, and has a plurality of wheel units 3a to 3c and 4a to 4c in a front/rear direction mounted at respective right and left side faces. Each of the wheel units includes a wheel 5 that is rollably supported by the guide rail 2a or 2b, the wheel units 3a to 3c at one guide rail 2a side is provided with four positioning guide rollers 7 that are respectively rotatable around a vertical support shaft 6 and are pivotally supported by the vertical support shaft so as to sandwich the guide rail 2a from both right and left sides at two front and rear locations, and further, one wheel unit 3c has a motor 8 installed adjacent thereto that drives the wheel 5 of the unit to rotate forward and in reverse. The structure of support of the conveying traveling body 1 by the guide rails 2a and 2b is not restricted to the above configuration and, for example, the wheel units 3b and 4b disposed at intermediate portions of respective side faces may be omitted in some cases. Also, although a traveling drive means where one of the wheels 5 is driven by a motor 5 is illustrated, any of various conventionally-known traveling drive means, for example, a chain drive system or frictional drive system, etc., may be utilized as the means of performing traveling drive of the conveying traveling body 1.

The conveying traveling body 1 is provided with a conveyed object supporter 9 supporting a conveyed object (automotive vehicle body, etc.) W, two front and rear suspension lines 10 and 11 suspending the conveyed object supporter 9, and two suspension line pulling-up/feeding means 12 and 13 that elevate and lower the two suspension lines 10 and 11 respectively and individually, and the respective suspension line pulling-up/feeding means 12 and 13 include screw shafts 14 and 15 self-rotatably borne by the conveying traveling body 1 and driven bodies 16 and 17 engaged with the screw shafts 14 and 15 and moved reciprocally by forward/reverse rotation of the screw shafts 14 and 15 to perform pulling-up/feeding operation of the suspension lines 10 and 11. The two suspension line pulling-up/feeding means 12 and 13 has installed adjacent thereto a single motor 18 configured to drive the screw shafts 14 and 15 thereof.

To describe specifically below, each of the suspension lines 10 and 11 is constituted of two chains 19a and 19b that move integrally in parallel in a right/left direction. On the other hand, with the conveying traveling body 1, suspension guide wheels 20 and 21, each constituted of a pair of right and left sprocket wheels that rotate integrally, are pivotally supported by horizontal support shafts at positions, which, in plan view, are on a center line parallel to a front/rear travel direction of the conveying traveling body 1 and separated by just the same distance to the front and rear from a central position in the front/rear travel direction of the conveying traveling body 1, and the chains 19a and 19b of the suspension lines 10 and 11 hang down from the suspension guide wheels 20 and 21 and suspend two locations at the front and rear of the conveyed object supporter 9.

The screw shafts 14 and 15 of the respective suspension line pulling-up/feeding means 12, 13 are disposed to be concentric and in series with respect to each other in parallel to the front/rear travel direction of the conveying traveling body 1 at one side of the suspension guide wheels 20 and 21, and, with mutually adjacent inner end portions thereof in a state of being separated by just the same distance to the front and rear from the central position in the front/rear travel direction of the conveying traveling body 1, respective front and rear end portions are borne via bearings by the conveying traveling body 1. The two screw shafts 14 and 15 are of the same diameter and of mutually reverse screw structures, with the front side screw shaft 14 gradually increasing in feed pitch from an outer end (front end) toward an inner end (rear end) and the rear side screw shaft 15 gradually increasing in feed pitch from an inner end (front end) toward an outer end (rear end), and the respective screw shafts 14 and 15 are the same in maximum feed pitch and minimum feed pitch and the same in number of rotations for obtaining a feed amount corresponding to the total length of both screw shafts 14 and 15. In other words, the front side screw shaft 14 has a configuration where a low-speed drive region 14a, which is small in feed pitch, positioned at the outer end (front end) side and a high-speed drive region 14b, which is large in feed pitch, positioned at the inner end (rear end) side, and oppositely, the rear side screw shaft 15 has a configuration where a low-speed drive region 15a, which is small in feed pitch, positioned at the inner end (front end) side and a high-speed drive region 15b, which is large in feed pitch, positioned at the outer end (rear end) side.

The single motor 18 is supported in a right/left horizontal orientation by the conveying traveling body 1 at a side, opposite the side at which the suspension guide wheels 20 and 21 are disposed, of a portion between the mutually adjacent inner end portions of the two screw shafts 14 and 15 disposed in series at the front and rear, and a speed reducer 22, coupled to an output shaft thereof and disposed between the mutually adjacent inner end portions of the screw shafts 14 and 15, includes an output shaft directly coupled to the screw shafts 14 and 15 at the respective front and rear sides and drives both screw shafts 14 and 15 to rotate in the same direction and the same speed.

The driven bodies 16 and 17 of the respective suspension line pulling-up/feeding means 12 and 13 have mutually the same structure each including a main body 23, a driven roller 24, and a suspension line latching member 25, with the main body 23 being supported, in a manner enabling reciprocal movement parallel to the screw shaft 14 or 15, via guide rollers 28 or 29 by a pair of right and left guide rails 26 or 27 laid at an upper side of the screw shaft 14 or 15, and the driven roller 24 being pivotally supported by a vertical support shaft at a lower side of the main body 23 and engaged inside a spiral groove of the screw shaft 14 or 15 directly below. The suspension line latching member 25 extends horizontally from an upper side of the main body 23, via an upper side of a guide rail 26 or 27 at one side, to the side at which the suspension guide wheel 20 or 21 is disposed. The two suspension lines 10 and 11, suspending the two front and rear locations of the conveyed object supporter 9 at one ends, are guided from upper sides of the suspension guide wheels 20 and 21 to a central side of approaching each other and, after further being turned outward to separate from each other by turning guide wheels 30 and 31, have free ends latched to lower sides of extended end portions of the suspension line latching members 25. As with the suspension guide wheels 20 and 21, the turning guide wheels 30 and 31 are each constituted of a pair of right and left sprocket wheels that rotate integrally with each other and are pivotally supported via horizontal support shafts by the conveying traveling body 1 so as to be adjacent to inner end portions of the respective screw shafts 14 and 15, and the suspension lines 10 and 11, leading to the suspension line latching members 25 of the driven bodies 16 and 17 from the turning guide wheels 30 and 31, are made parallel to the screw shafts 14 and 15 on the center line parallel to the front/rear travel direction of the conveying traveling body 1 in plan view.

Figure 2:
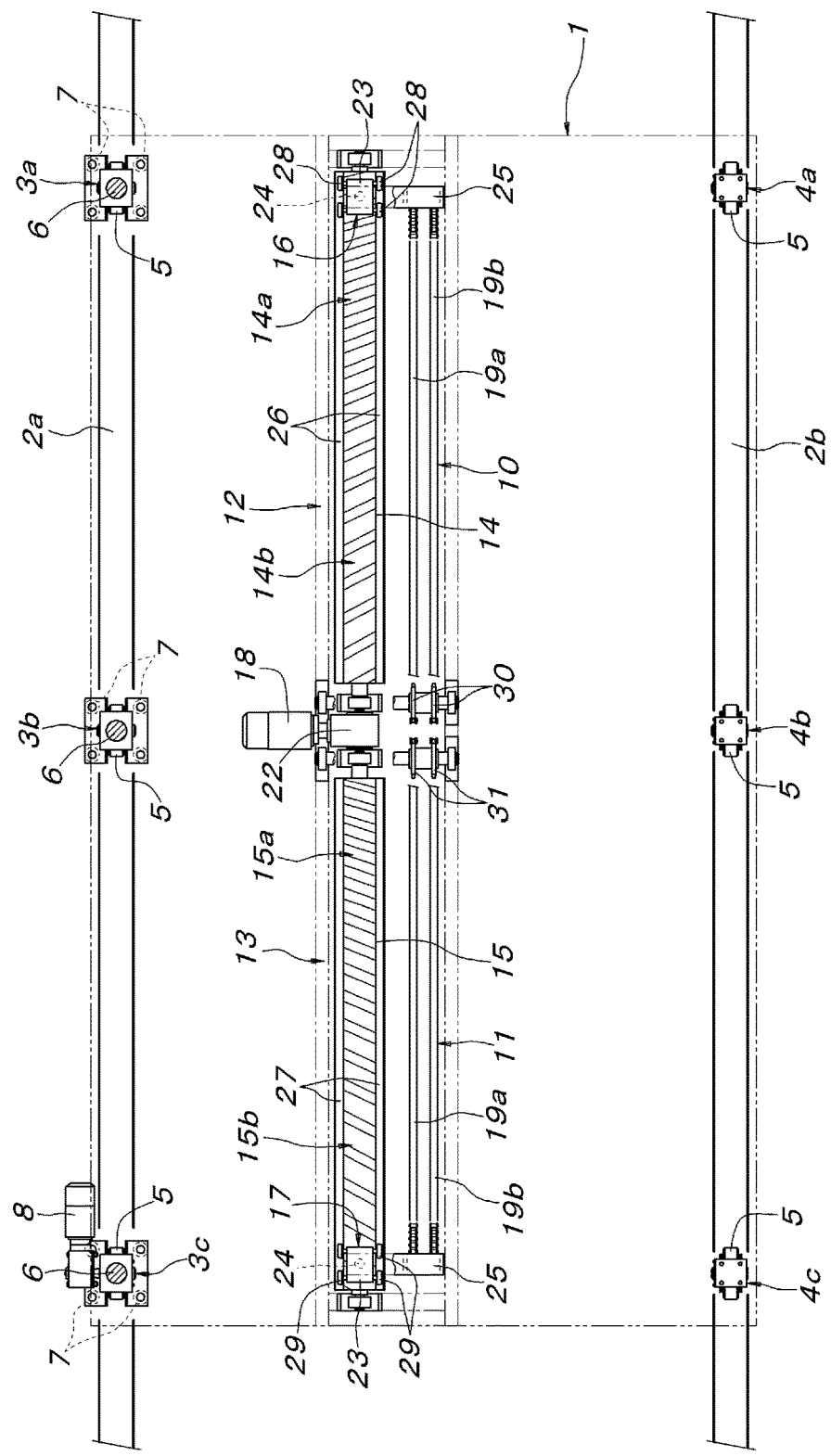
FIG. 2 is a partial transverse sectional plan view illustrating a support structure of the conveying traveling body and two front and rear suspension line pulling-up/feeding means provided in the conveying traveling body.
Figure 3:
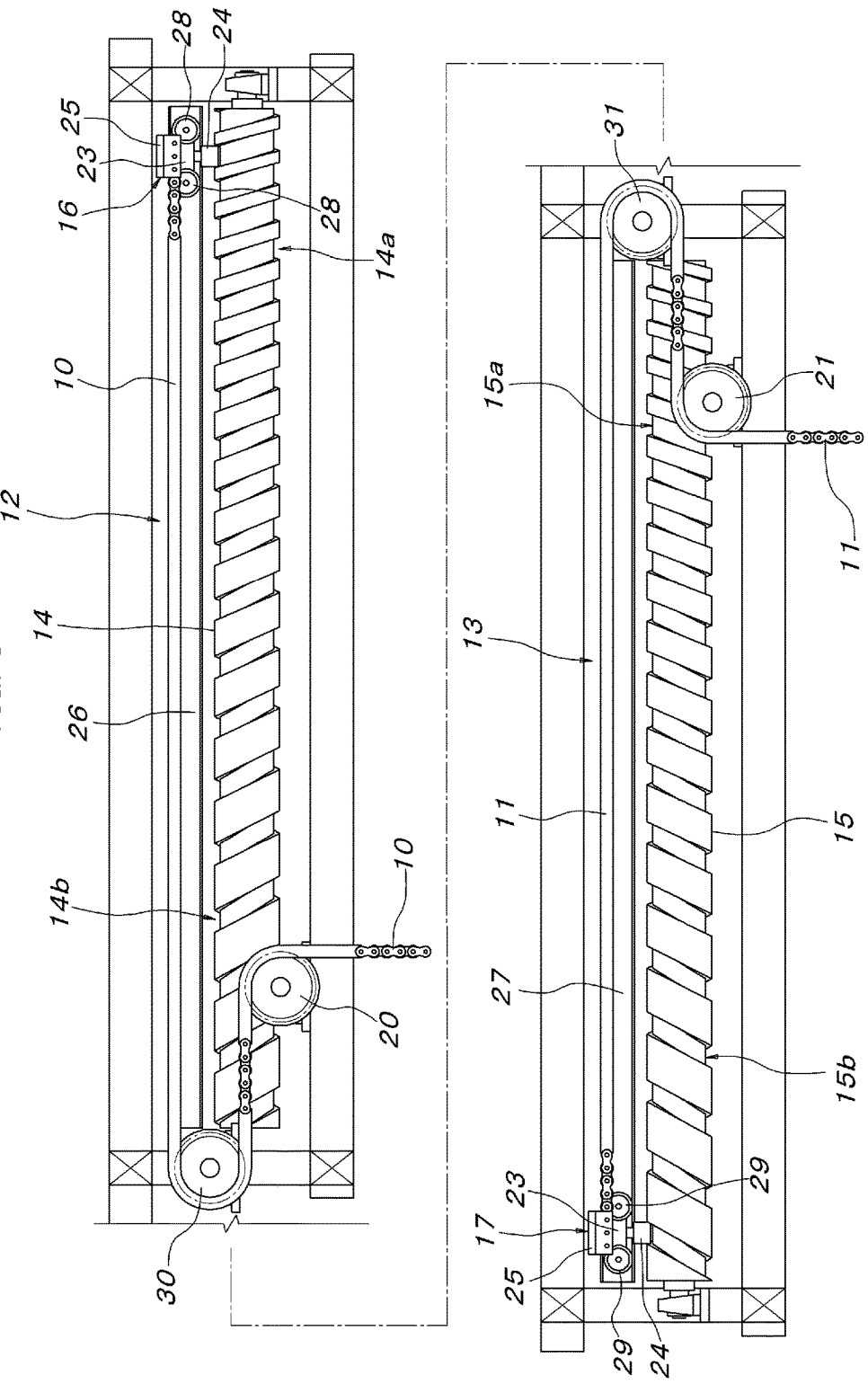
FIG. 3 is a side view illustrating the two front and rear suspension line pulling-up/feeding means.
Figure 4:
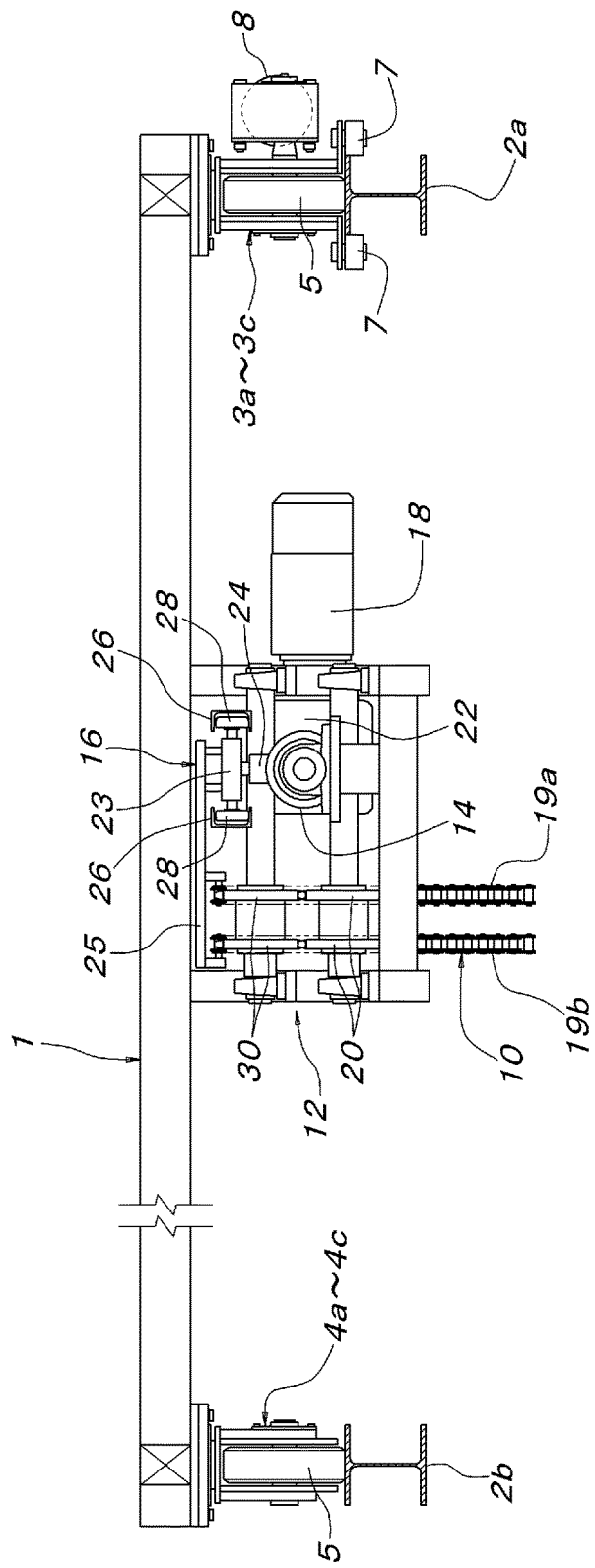
FIG. 4 is a front view of the conveying traveling body including a suspension line pulling-up/feeding means.

As shown in FIG. 1, when the conveying traveling body 1 travels on the fixed travel path while being supported by the guide rails 2a and 2b, the conveyed object supporter 9 that supports the conveyed object W is in a horizontal orientation of being hoisted to an elevation limit height of most closely approaching the conveying traveling body 1. In this state, the respective driven bodies 16 and 17 that are in states of having pulled up the respective suspension lines 10 and 11 are at elevation limit side fixed positions p1 and p2 at outer end portions of the respective screw shafts 14 and 15 and are in states of being most separated from each other in the front/rear direction. Therefore, as shown in FIG. 2 and FIG. 3, the driven body 16 having pulled up the front side suspension line 10 is in a state where the driven roller 24 is engaged with an outer end portion of the low-speed drive region 14a of the front side screw shaft 14, and the driven body 17 having pulled up the rear side suspension line 11 is in a state where the driven roller 24 is engaged with an outer end portion of the high-speed drive region 15a of the rear side screw shaft 15.

The conveying traveling body 1, with which the conveyed object supporter 9, supporting the conveyed object W, is hoisted to the elevation limit height as described above, travels forward at a fixed speed on the guide rails 2a and 2b by the wheel 5 of one wheel unit 3c thereof being driven by the motor 8. In the travel path of the conveying traveling body 1, a treatment tank 32 is installed along the travel path. The treatment tank 32 is filled with a coating, with which the conveyed object W is coated by immersingly moving the conveyed object W, or a treatment liquid for performing a pretreatment before coating, etc., and has a depth enabling the conveyed object W to be immersed completely and a total length required for treatment.

Figure 7:
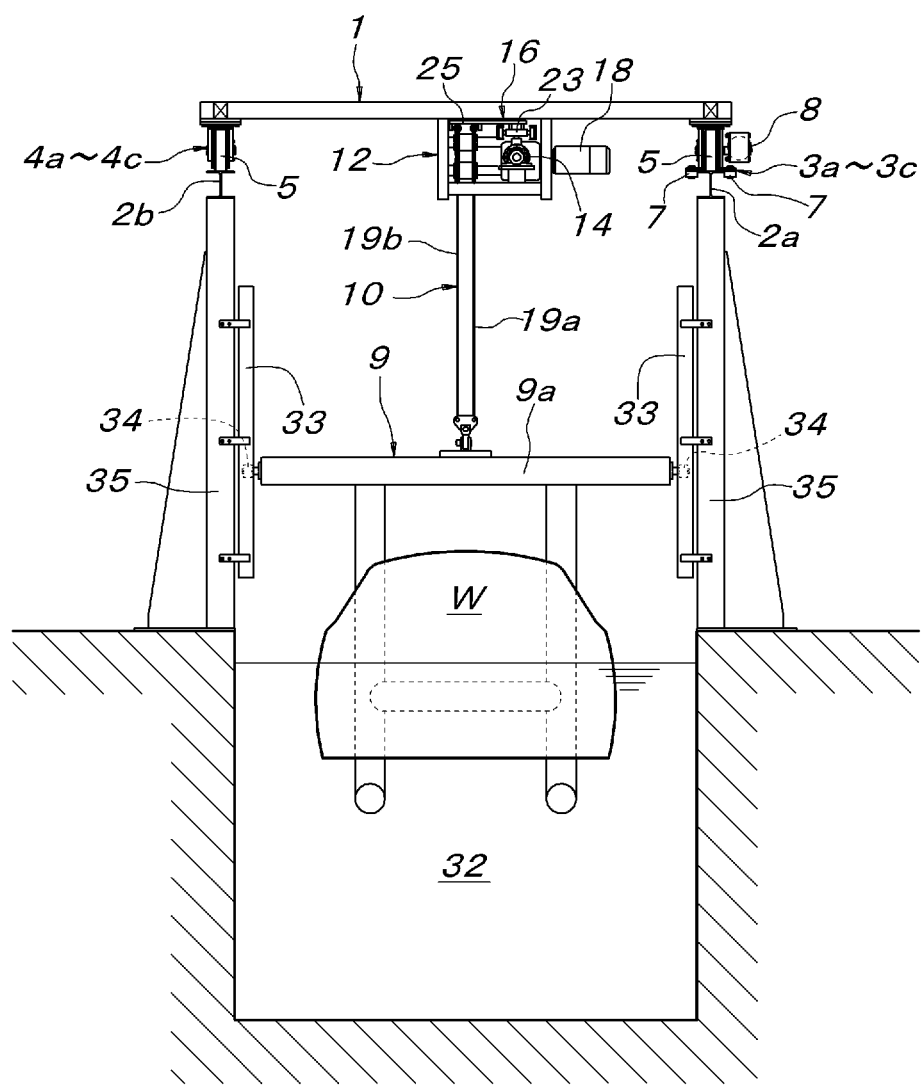
FIG. 7 is a front view in a state where the tilting of the conveyed object of FIG. 6 is ignored.
Figure 8:
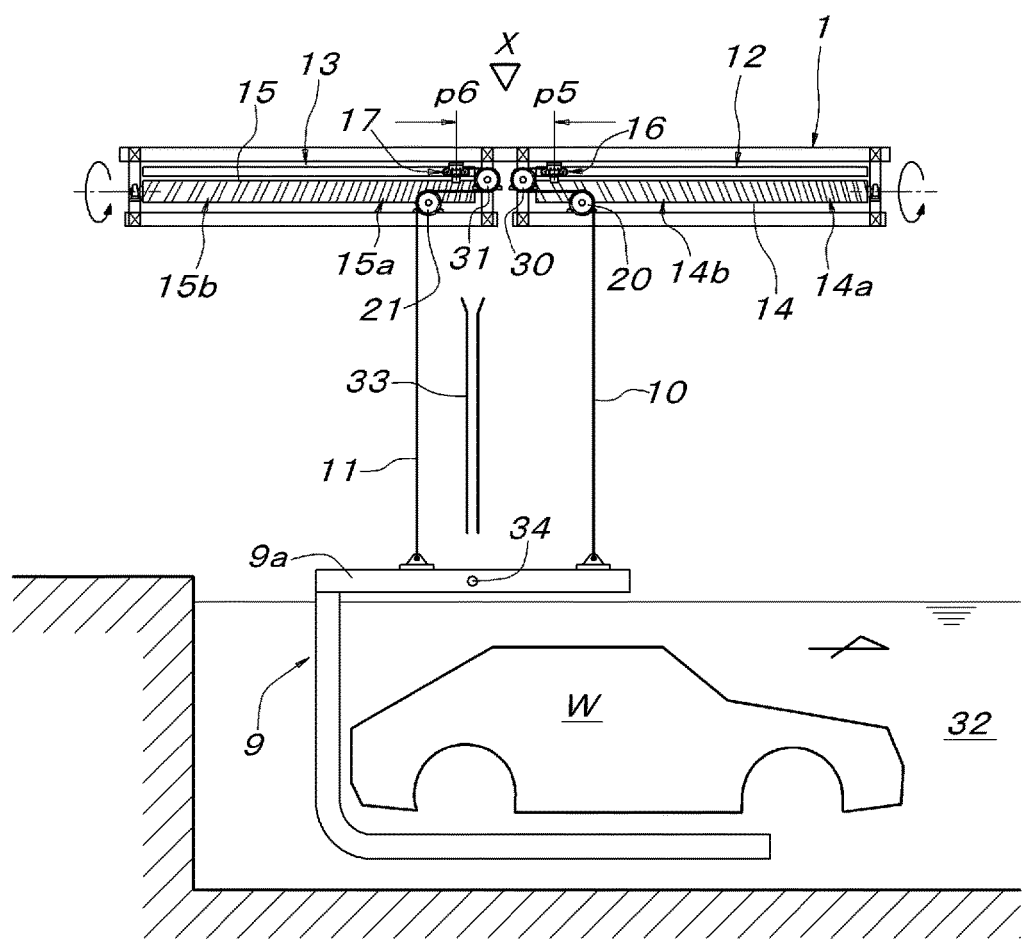
FIG. 8 is a side view for describing a state where the conveyed object has reached a lowering limit height at the entrance portion of the treatment tank.

When the conveying traveling body 1 traveling forward on the travel path is stopped at a fixed position X on an entrance portion of the treatment tank 32 as shown in FIG. 1, the single motor 18 in common to the two front and rear suspension line pulling-up/feeding means 12 and 13 is put in operation to drive both screw shafts 14 and 15 to rotate in the same forward direction at the same speed. Here, both screw shafts 14 and 15 have the structure described above, and therefore by driving these respectively to rotate in the same forward direction at the same speed, the respective driven bodies 16 and 17, which were at the elevation limit side fixed positions p1 and p2 at the outer end portions of the respective screw shafts 14 and 15, can be made to move to the central side to approach each other and eventually arrive simultaneously and stop, by stoppage control of the motor 18, at lowering limit side fixed positions p5 and p6 at inner end portions of the respective screw shafts 14 and 15 as shown in FIG. 8. That is, the suspension lines 10 and 11 are fed out by the approaching movement of the respective driven bodies 16 and 17 to the central side and, as shown in FIG. 6 and FIG. 7, the conveyed object supporter 9 suspended by both suspension lines 10 and 11 is lowered from the elevation limit height.

Figure 6:
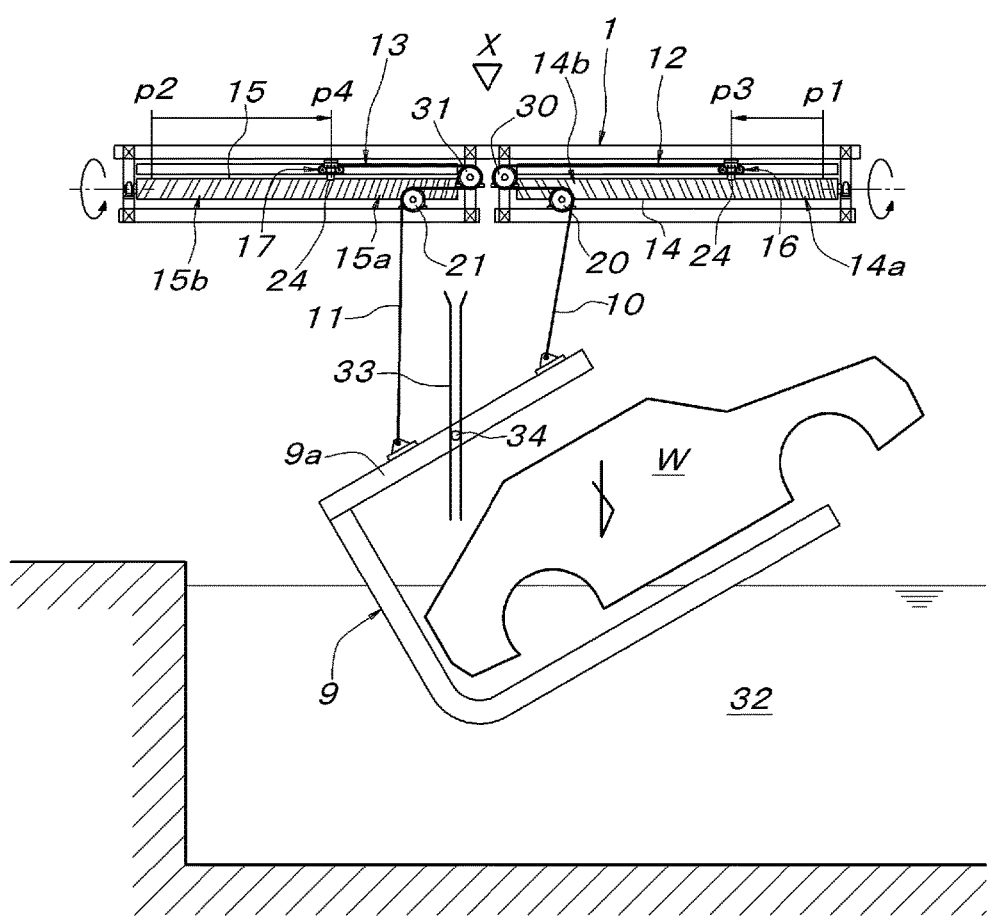
FIG. 6 is a side view for describing a state where the conveyed object, being lowered from the conveying traveling body stopped at the entrance portion upper fixed position of the treatment tank, is put in a tilted orientation.

In this process, by actions of the low-speed drive regions 14a and 15a and the high-speed drive regions 14b and 15b included in the respective screw shafts 14 and 15, whereas the driven body 16 that feeds out the front side suspension line 10 is moved to the central side at a low speed by the low-speed drive region 14a of the screw shaft 14, the driven body 17 that feeds out the rear side suspension line 11 is moved to the central side at a high speed by the high-speed drive region 15a of the screw shaft 15 as shown in FIG. 6. That is, when the conveyed object supporter 9 is lowered from the elevation limit height by the feeding out of the suspension lines 10 and 11, a feed length of the rear side suspension line 11 becomes longer than a feed length of the front side suspension line 10, and as illustrated, the conveyed object supporter 9 (conveyed object W), which is suspended and lowered by both suspension lines 10 and 11, becomes tilted in rear-lowered manner from the horizontal orientation. A rear-lowered tilt angle of the conveyed object supporter 9 increases gradually until the driven bodies 16 and 17 reach intermediate positions p3 and p4, between the low-speed drive regions 14a and 15a and the high-speed drive regions 14b and 15b of the respective screw shafts 14 and 15, at which the feed pitches become equal as shown in FIG. 6, and thereafter, the front side driven body 16 enters the high-speed drive region 14b of the screw shaft 14 and the rear side driven body 17 enters the low-speed drive region 15a of the screw shaft 15 so that the rear-lowered tilt angle of the conveyed object supporter 9 decreases gradually, and when the respective driven bodies 16 and 17 eventually arrive and stop at the lowering limit side fixed positions p5 and p6 at the inner end portions of the respective screw shafts 14 and 15 as shown in FIG. 8, the conveyed object supporter 9 (conveyed object W) is positioned at a lowering limit height with respect to the conveying traveling body 1 in a state of being returned to the horizontal orientation.

Figure 5:
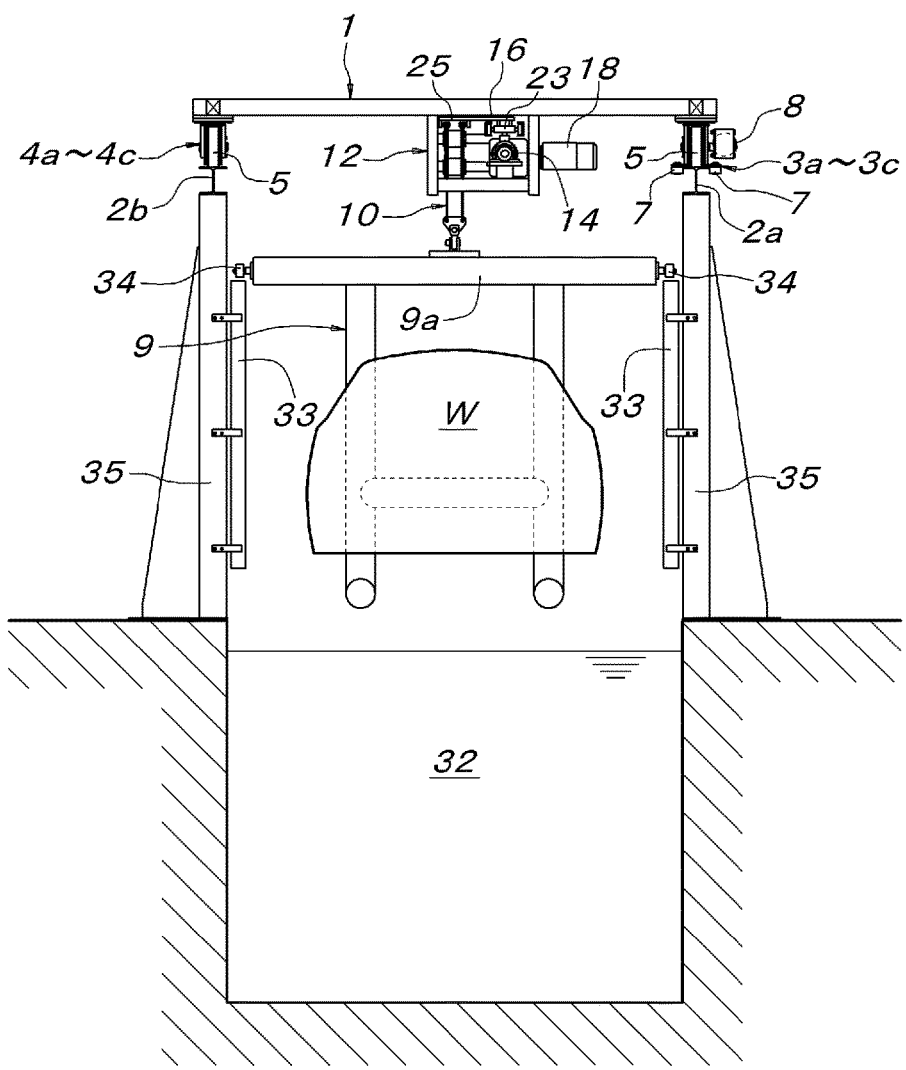
FIG. 5 is a front view illustrating the conveying traveling body at an entrance portion upper fixed position (or exit portion upper position) of the treatment tank.
Figure 9:
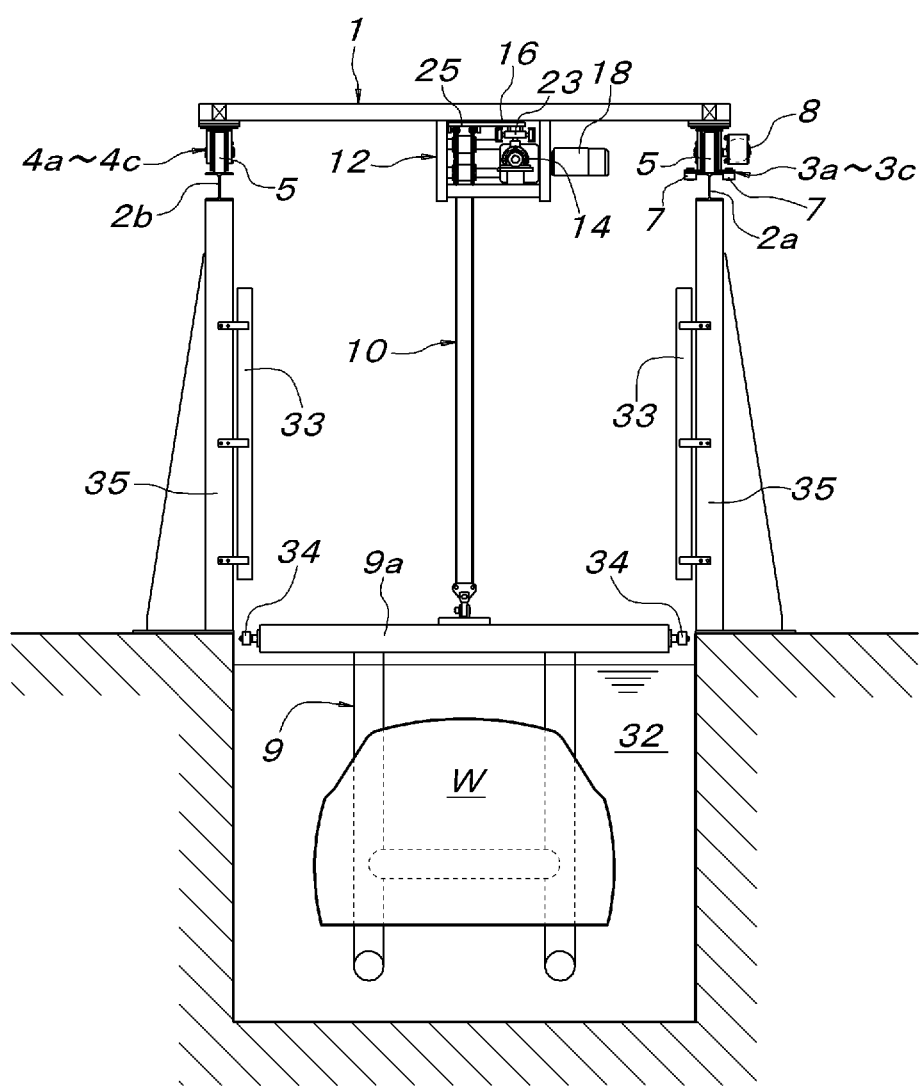
FIG. 9 is a front view of FIG. 8.

As described above, by making the screw shafts 14 and 15 of the respective suspension line pulling-up/feeding means 12 and 13 be driven to rotate in the same forward direction at the same speed for just a fixed time by a single motor 18, the conveyed object W supported by the conveyed object supporter 9 can be lowered while being tilted in rear-lowered manner and eventually be lowered in a horizontal orientation to a bottom of the entrance portion inside the treatment tank 32 as shown in FIG. 8 and FIG. 9. It may be considered that in the process of lowering the conveyed object W, the conveyed object W will swing in the front/rear direction together with the conveyed object supporter 9 suspended by the suspension lines 10 and 11. To suppress the front/rear swinging of the conveyed object W, guide rails 33, which restrict a front/rear direction position of the conveyed object supporter 9 that is being lowered, may be installed adjacent to the entrance portion of the treatment tank 32. As shown in FIG. 1 and FIG. 5, the guide rails 33 are laid vertically at both right and left sides of a lowering path of the conveyed object supporter 9 at the entrance portion of the treatment tank 32 and have a length such that a pair of right and left guide rollers 34, which are pivotally supported concentrically to each other by an upper end frame 9*a* of the conveyed object supporter 9, become fitted immediately after the conveyed object supporter 9 starts to be lowered from the elevation limit height and become detached downwardly slightly before the conveyed object supporter 9 reaches the lowering limit height.

Therefore, from immediately after the conveyed object supporter 9 starts to be lowered from the elevation limit height, the positions of the guide rollers 34 of the conveyed object supporter 9 are restricted to be on vertical lines aligned, with the guide rails 33, by the fitting of the pair of right and left guide rollers 34 with the pair of right and left guide rails 33, and the rear-lowered tilting of the conveyed object supporter 9 in the middle of the lowering is performed with the pair of right and left guide rollers 34 as fulcrums. By the conveyed object supporter 9 (conveyed object W) thus being lowered in the state of being tilted in rear-lowered manner, the conveyed object W becomes immersed from its rear end portion into the treatment liquid inside the treatment tank 32, and in comparison to a case of immersion into the treatment liquid while remaining in the horizontal orientation, resistance in the process of immersion into the treatment liquid is reduced and the conveyed object W can be immersed smoothly into the treatment liquid inside the treatment tank 32.

As shown in FIG. 5, the pair of right and left guide rails 33 may be mounted to column members 35 that are erected at both sides of the entrance portion of the treatment tank 32 and support the pair of right and left guide rails 2*a* and 2*b* that supportingly guide the conveying traveling body 1.

When the conveyed object supporter 9 has been lowered to the lowering limit height from the conveying traveling body 1 stopped at the fixed position X on the entrance portion and the conveyed object W has been immersed to a prescribed depth into the treatment liquid inside the treatment tank 32, the conveying traveling body 1 is made to travel forward to make the conveyed object W on the suspended conveyed object supporter 9 move at a prescribed speed inside the treatment liquid to an exit of the treatment tank 32 and treatment by the treatment liquid is executed on the conveyed object W. When the conveying traveling body 1 reaches a fixed position Y on the exit portion of the treatment tank 32 shown in FIG. 10, the conveying traveling body 1 is stopped and then the screw shafts 14 and 15 of the two front and rear suspension line pulling-up/feeding means 12 and 13 are driven to rotate in the same reverse direction at the same speed by the single motor 18. Here, both screw shafts 14 and 15 have the structure described above, and therefore when these are respectively driven to rotate in the same reverse direction at the same speed, the respective driven bodies 16 and 17, which were at the lowering limit side fixed positions p5 and p6 at the inner end portions of the respective screw shafts 14 and 15, move outward to separate from each other and eventually arrive simultaneously at the elevation limit side fixed positions p1 and p2 at the outer end portions of the respective screw shafts 14 and 15, and the motor 18 is thus stopped at this point. That is, the suspension lines 10 and 11 are pulled up by the outward separating movement of the respective driven bodies 16 and 17 and, as respectively indicated by virtual lines in FIG. 10 and FIG. 11A, the conveyed object supporter 9 (conveyed object W) suspended by both suspension lines 10 and 11 can be returned to the original elevation limit height of being withdrawn upward from inside the treatment tank 32.

Figure 10:
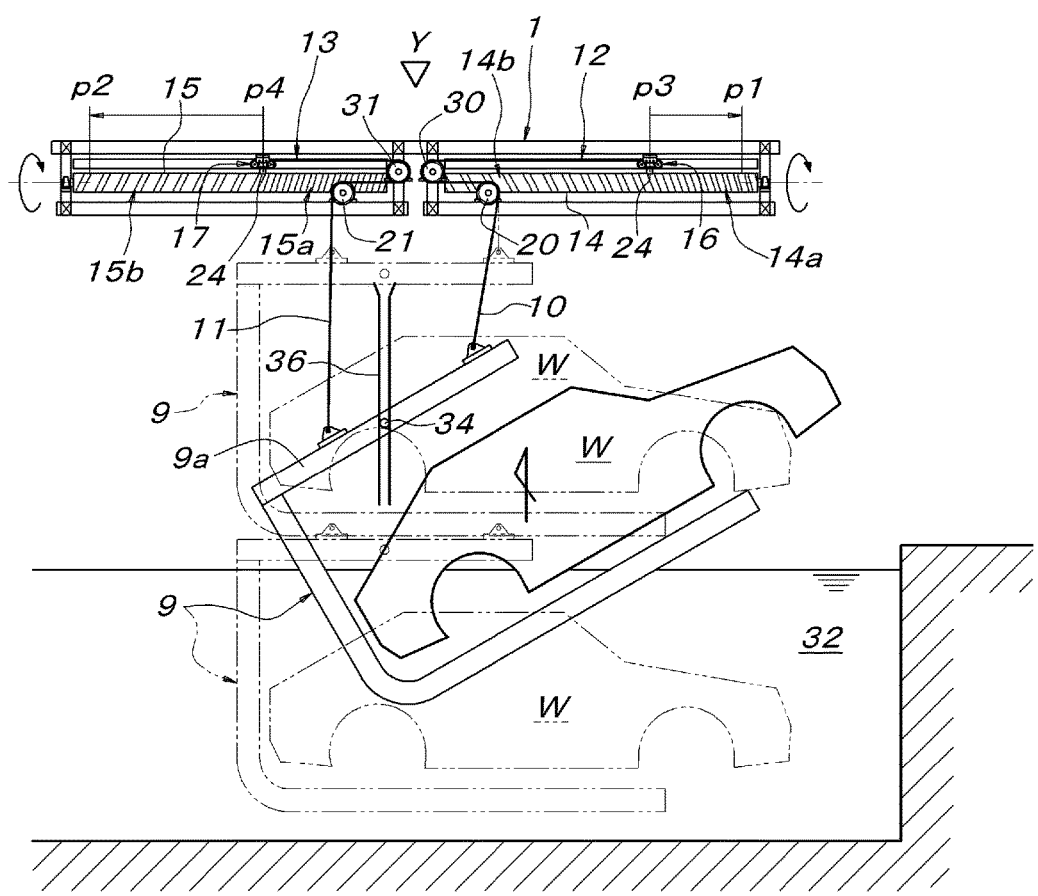
FIG. 10 is a side view for describing a state where the conveyed object, being hoisted at the treatment tank exit portion, is put in a tilted orientation.

In this process, by actions of the low-speed drive regions 14*a* and 15*a* and the high-speed drive regions 14*b* and 15*b* included in the respective screw shafts 14 and 15, whereas the driven body 16 that pulls up the front side suspension line 10 is moved outward at a high speed by the high-speed drive region 14*b* of the screw shaft 14, the driven body 17 that pulls up the rear side suspension line 11 is moved outward at a low speed by the low-speed drive region 15*b* of the screw shaft 15 as shown in FIG. 10. That is, when the conveyed object supporter 9 is elevated from the lowering limit height by the pulling up of the suspension lines 10 and 11, a pulled-up length of the front side suspension line 10 becomes longer than a pulled-up length of the rear side suspension line 11, and as illustrated, the conveyed object supporter 9 (conveyed object W), which is suspended and elevated by both suspension lines 10 and 11, becomes tilted in front-raised manner from the horizontal orientation. A front-raised tilt angle of the conveyed object supporter 9 increases gradually until the driven bodies 16 and 17 reach the intermediate positions p3 and p4, between the low-speed drive regions 14*a* and 15*a* and the high-speed drive regions 14*b* and 15*b* of the respective screw shafts 14 and 15, at which the feed pitches become equal as shown in FIG. 10, and thereafter, the front side driven body 16 enters the low-speed drive region 14*a* of the screw shaft 14 and the rear side driven body 17 enters the high-speed drive region 15*b* of the screw shaft 15 so that the front-raised tilt angle of the conveyed object supporter 9 decreases gradually, and when the respective driven bodies 16 and 17 eventually arrive and stop at the elevation limit side fixed positions p1 and p2 at the outer end portions of the respective screw shafts 14 and 15, the conveyed object supporter 9 (conveyed object W) returns to the original elevation limit height shown in FIG. 1 in the horizontal orientation.

Figure 11A:
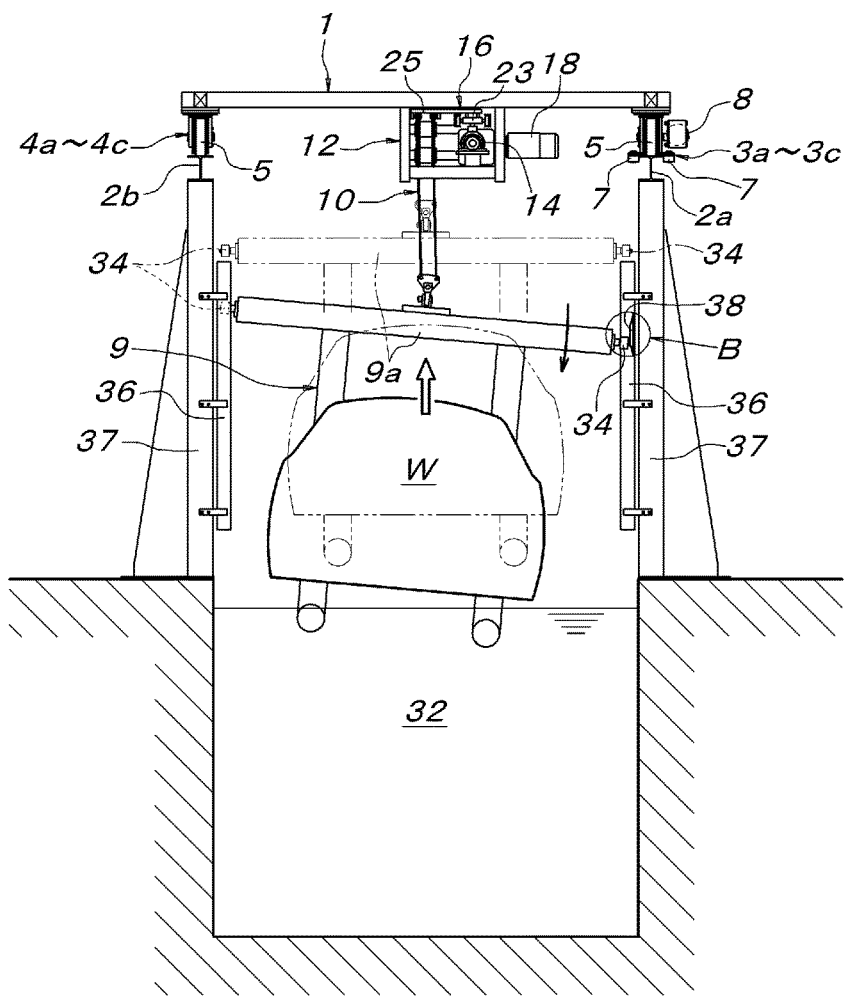
FIG. 11A is a front view for describing another embodiment and FIG. 11B is an enlarged longitudinal sectional view of a B portion of FIG. 11A.

By making the conveyed object W on the conveyed object supporter 9 that was immersed in the treatment liquid inside the treatment tank 32 elevate while being tilt in front-raised manner as described above, the treatment liquid that has entered inside the conveyed object W can be made to flow to a lower end side of the tilt (rear end side) of the conveyed object W and made to flow out to the exterior, and the amount of treatment liquid remaining inside the conveyed object W can be reduced significantly in comparison to a case of elevating the conveyed object W as it is in the horizontal orientation. It may be considered that the conveyed object W will swing in the front/rear direction together with the conveyed object supporter 9 suspended by the suspension lines 10 and 11 in the process of elevating the conveyed object W as well, and therefore guide rails 36, which restrict the front/rear direction position of the conveyed object supporter 9 that is being elevated, may be installed adjacent to the exit portion of the treatment tank 32. As shown in FIG. 10 and FIG. 11A, the guide rails 36 are laid vertically at both right and left sides of an elevation path of the conveyed object supporter 9 at the exit portion of the treatment tank 32 and have a length such that the pair of right and left guide rollers 34, which are pivotally supported by the upper end frame 9*a* of the conveyed object supporter 9, become fitted immediately after the conveyed object supporter 9 starts to be elevated from the lowering limit height and become detached upwardly slightly before the conveyed object supporter 9 reaches the elevation limit height. Therefore, from immediately after the conveyed object supporter 9 starts to be elevated from the lowering limit height, the positions of the guide rollers 34 of the conveyed object supporter 9 are restricted to be on vertical lines, aligned with the guide rails 36, by the fitting of the pair of right and left guide rollers 34 with the pair of right and left guide rails 36, and the front-raised tilting of the conveyed object supporter 9 in the middle of the elevation is performed with the pair of right and left guide rollers 34 as fulcrums.

As shown in FIG. 11A, the pair of right and left guide rails 36 may be mounted to column members 37 that are erected at both sides of the exit portion of the treatment tank 32 and support the pair of right and left guide rails 2a and 2b that supportingly guide the conveying traveling body 1.

Figure 11B:
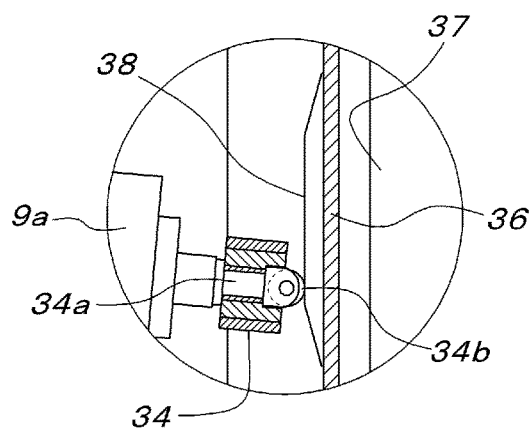

Also, as described above, the operation of tilting the conveyed object W when the conveyed object W is withdrawn upward from inside the treatment tank 32 has the effect of reducing the amount of treatment liquid remaining inside the conveyed object W, and to further enhance this effect, the pair of right and left guide rollers 34 pivotally supported by the upper end frame 9a of the conveyed object supporter 9 may have steady guide rollers 34b, which project to outer sides of the guide rollers 34 and are pivotally supported in rotatable manner by front/rear direction support shafts, incorporated therein as shown in FIG. 11A and FIG. 11B by utilizing fixed support shafts 34a that rotatably bear the guide rollers 34, and inside one guide rail among the pair of right and left guide rails 36, an auxiliary cam rail 38, acting to push outward the steady guide roller 34b being elevated inside the guide rail 36, may be installed additionally.

With the present configuration, when the guide rollers 34 are elevated or lowered inside the guide rails 33 or 36, at locations without the auxiliary cam rail 38, the pair of right and left steady guide rollers 34b can be made to roll close to or in contact with groove bottom surfaces of the guide rails 33 or 36 to not only obviously achieve the primary object of suppressing the front/rear direction swinging of the conveyed object supporter 9 (conveyed object W) that is being elevated or lowered but also to perform smooth elevation or lowering while sufficiently suppressing right/left direction swinging movement of the conveyed object supporter 9 (conveyed object W) that is being elevated or lowered. When, at the exit portion of the treatment tank 32, the conveyed object supporter 9 (conveyed object W) is pulled up while being front-raised tilted in regard to the front/rear direction by the suspension lines 10 and 11 as shown in FIG. 10 to FIG. 11B, the steady guide roller 34b incorporated in the guide roller 34 at one side contacts a lower end side of the auxiliary cam rail 38 to receive resistance against elevation in the middle of the elevation so that the conveyed object supporter 9 also tilts in regard to the right/left direction in a manner such that the side at which the cam rail 38 is present is lowered relative to the opposite side. The tilted orientation of the conveyed object supporter 9 in regard to the right/left direction is maintained while the steady guide roller 34b rolls on the auxiliary cam rail 38, and when the steady guide roller 34b separates upwardly from the auxiliary cam rail 38, the conveyed object supporter 9 returns to its original orientation due to gravity. That is, when the conveyed object supporter 9 is pulled up while being front-raised tilted in regard to the front/rear direction by the suspension lines 10, 11, the conveyed object supporter 9 is also tilted in regard to the right/left direction at the same time so that the conveyed object W supported by the conveyed object supporter 9 is swung in regard to both the front/rear direction and the right/left direction and the treatment liquid tending to remain in the interior is discharged effectively.

In regard to the low-speed drive regions 14a and 15a and the high-speed drive regions 14b and 15b of the screw shafts 14 and 15 that are the means to tilt the conveyed object supporter 9 in regard to the front/rear direction during elevation and lowering, although the configuration where the feed pitches change in a continuous manner across the entire lengths of the screw shafts 14 and 15 is adopted in the embodiment described above, the regions may also be configured dividedly into low-speed drive regions 14a and 15a, in each of which the feed pitch is fixed across the entire length of the region and the feed pitch is small, and high-speed drive regions 14b and 15b, in each of which the feed pitch is fixed across the entire length of the region and the feed pitch is large. Also when the present arrangement is adopted, intermediate-speed drive regions of a feed pitch intermediate the feed pitches of the respective regions may be interposed at intermediate positions between the low-speed drive regions 14a and 15a and the high-speed drive regions 14b and 15b. Further, respective ends of each of the screw shafts 14 and 15 may b e provide with fixed feed pitch regions of fixed length, at each of which the feed pitch at the terminal end of the immediately prior low-speed drive region 14a or 15a or high-speed drive region 14b or 15b is sustained.

Also, although the embodiment described above is configured so that the conveyed object supporter 9 (conveyed object W) that is elevated or lowered is tilted in a rear-lowered (front-raised) manner in regard to the traveling front/rear direction of the conveying traveling body 1 in the middle of the elevation or lowering, a configuration is also possible where tilting in a front-lowered (rear-raised) manner is performed. Further, in light of the object of tilting the conveyed object supporter 9 (conveyed object W) in the middle of elevation or lowering, it is preferable to configure so that an inclination lower end portion (rear end portion or front end portion) of the conveyed object W supported by the conveyed object supporter 9 is positioned near the height of the surface of the treatment liquid inside the treatment tank 32 when the maximum tilt angle of the conveyed object supporter 9 is reached. Similarly, it is effective to configure so that the tilting of the conveyed object supporter 9 (conveyed object W) in regard to the right/left direction in the middle of elevation by use of the auxiliary cam rail 38 and the pair of right and left steady guide rollers 34b at the conveyed object supporter 9 side shown in FIG. 11A and FIG. 11B is also executed under circumstances where the conveyed object W has been pulled up above the treatment liquid from inside the treatment liquid inside the treatment tank 32.

Although the embodiment described above is configured so that at each of the entrance portion and the exit portion of the treatment tank 32, the conveyed object supporter 9 is lowered or elevated in a state where the conveying traveling body 1 is stopped at the fixed position X or Y, if the configuration, illustrated with the embodiment, of using the pair of right and left guide rollers 34 at the conveyed object supporter 9 side and the vertical guide rails 33 and 36 laid at the sides of the lowering and elevation paths of the conveyed object supporter 9 to suppress the front/rear direction swinging of the conveyed object supporter 9 being lowered or elevated, and the configuration, using the steady guide rollers 34b and the auxiliary cam rail 38 to make the conveyed object supporter 9 being lowered or elevated to tilt in regard to the right/left direction as well, are not to be adopted, the conveyed object supporter 9 may be configured to be lowered or elevated at the same time as making the conveying traveling body 1 travel forward at a fixed speed.

Further, although with the embodiment, the screw shafts 14 and 15 used in the two suspension line pulling-up/feeding means 12 and 13 are made to have mutually reverse screw structures and both screw shafts 14 and 15 are configured to be driven to rotate in the same direction at the same speed, if the screw shafts 14 and 15 are to be configured using two screw shafts of exactly the same structure, the respective screw shafts 14 and 15 may be configured to be driven to rotate at the same speed in mutually opposite directions. Also, the specific structures of the respective screw shafts 14 and 15 are not restricted in particular. For example, each screw shaft may be a screw shaft with which a blade, projecting in a radial direction, is spirally wound around and fastened to a circumferential surface of a shaft body, or may be a screw shaft with which a spiral cylinder, constituted by spirally forming a notched groove of prescribed width in a circular cylinder, is disposed concentrically at an outer side of a shaft body and the two are coupled and integrated by a radial direction support member. Also, although each of the respective driven bodies 16 and 17 is configured to be driven by a single screw shaft 14 or 15, it is also possible to configure each of the respective screw shafts 14 and 15 from two parallel and mutually interlockingly coupled screw shafts and configure each of the respective driven bodies 16 and 17 to be driven by two parallel screw shafts as described in Patent Literature 1 described above. Further, each of the screw shafts 14 and 15 may be configured from a plurality of screw shaft units that are divided in the axial direction and are interlockingly coupled to each other. In this case, it is possible to divide the screw shaft units into the screw shaft units configuring the low-speed drive regions 14a and 15a and the screw shaft units configuring the high-speed drive regions 14b and 15b.

The suspension conveying device according to the present invention can be put to practical use as a suspension conveying device for an automotive vehicle body, for example, in a pretreatment electrodeposition process for coating in which an automotive vehicle body that is suspendedly conveyed is lowered and immersed into and then moved in a treatment tank filled with a treatment liquid.

What is claimed is:

1. A suspension conveying device comprising:
    a conveying traveling body having a conveyed object supporter, two suspension lines that suspend the conveyed object supporter, and two suspension line pulling-up/feeding means to elevate and lower the two suspension lines respectively and individually;
    the respective suspension line pulling-up/feeding means including screw shafts rotatably borne by the conveying traveling body and driven bodies engaged with the screw shafts, the driven bodies being operable to move reciprocally by forward/reverse rotation of the screw shafts to perform pulling-up/feeding operation of the suspension lines;
    a motor operable to drives the screw shafts of the respective suspension line pulling-up/feeding means to rotate forward and in reverse;
    the screw shaft of each suspension line pulling-up/feeding means having a low-speed drive region, in which a feed pitch for the driven body is small, and a high-speed drive region, in which a feed pitch for the driven body is large;
    the respective screw shafts being disposed so that the low-speed drive regions and the high-speed drive regions are disposed mutually oppositely as viewed from the driven bodies when the conveyed object supporter is at one end of an elevation/lowering stroke; and
    the conveyed object supporter being tilted in a middle of the elevation/lowering stroke.

2. The suspension conveying device according to claim 1, wherein the motor comprises a single motor used in common in both suspension line pulling-up/feeding means and the single motor is interlockingly coupled to the screw shafts of the respective suspension line pulling-up/feeding means.

3. The suspension conveying device according to claim 2, wherein the screw shafts of the respective suspension line pulling-up/feeding means are disposed in series with respect to each other, mutually adjacent inner end portions of the respective screw shafts are interlockingly coupled to the single motor, and, when the screw shafts of the respective suspension line pulling-up/feeding means are driven to undergo forward/reverse rotation by the single motor, the driven bodies of the respective suspension line pulling-up/feeding means undergo a mutually approaching or separating movement, respectively.

4. The suspension conveying device according to claim 3, wherein the screw shafts of the respective suspension line pulling-up/feeding means have mutually reverse screw structures and are driven to undergo forward/reverse rotation in the same direction by the motor.

5. The suspension conveying device according to claim 4, wherein:
    the suspension lines of the respective suspension line pulling-up/feeding means hang down from suspension guide wheels, pivotally supported at two locations separated in a front/rear direction at a substantially central position of a width of the conveying traveling body;
    the suspension lines are operable to suspend two front and rear locations of the conveyed object supporter;
    the screw shafts of the respective suspension line pulling-up/feeding means are disposed in series concentrically in a front/rear direction at lateral side positions of the suspension guide wheels;
    each of the driven bodies of the respective suspension line pulling-up/feeding means includes:
        a main body supported in a manner enabling front/rear reciprocal movement in parallel to the corresponding screw shaft; by a pair of right and left guide rails laid at an upper side of the screw shaft,
        a driven roller pivotally supported by a vertical support shaft at a lower side of the main body and engaged with the screw shaft; and
        a suspension line latching member; and
    each suspension line has one end latched to the suspension line latching members of the respective driven body and is directed around turning guide wheels which is pivotally supported to be adjacent to the inner end portions of the respective screw shafts.

6. The suspension conveying device according to claim 1, wherein:
    a pair of right and left guide rollers are pivotally supported in a mutually concentric manner by the conveyed object supporter;
    a pair of right and left vertical guide rails, operable to engage with the guide rollers of the conveyed object supporter are disposed at a fixed position in a travel path of the conveying traveling body at which the conveying traveling body can be stopped to elevate or lower the conveyed object supporter; and the tilting of the conveyed object supporter in the front/rear direction is performed with the pair of right and left guide rollers in engagement with the right and left vertical guide rails and acting as fulcrums.

7. The suspension conveying device according to claim 6, wherein:
   steady guide rollers, which engage with the pair of right and left vertical guide rails to set the position of the conveyed object supporter in a right/left direction, are disposed adjacent to the pair of right and left guide rollers; and
   an auxiliary cam rail, on and along which the steady guide roller at one side can ride and pass while accompanying tilting of the conveyed object supporter in the right/left direction, is disposed in a guide rail at one side among the pair of right and left guide rails.

* * * * *